March 25, 1930.  H. F. SCHMIDT  1,751,604
POWER PLANT
Filed Feb. 14, 1925  2 Sheets-Sheet 1

H.F.Schmidt
INVENTOR

BY *D.C.Davis*

ATTORNEY

March 25, 1930.  H. F. SCHMIDT  1,751,604
POWER PLANT
Filed Feb. 14, 1925  2 Sheets-Sheet 2

WITNESS

H. F. Schmidt
INVENTOR
BY
ATTORNEY

Patented Mar. 25, 1930

1,751,604

UNITED STATES PATENT OFFICE

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA

POWER PLANT

Application filed February 14, 1925. Serial No. 9,104.

My invention relates to power plants and it has for its object to provide apparatus of the character designated which shall be capable of operating with efficient utilization of heat energy under various loads. It has for a further object to provide a combined turbine and electric generator installation, generally referred to as a house turbo-generator, for driving auxiliary machinery which shall assure the operation of the turbine should the current fail or diminish to an appreciable extent.

Still another object of my invention is to utilize the motive fluid exhausted from the house turbine in a heater for increasing the temperature of the feed water contained therein and, in addition, to maintain the feed water at a desired temperature by controlling the admission of motive fluid to the house turbine in response to the speed of an associated turbine, or main turbine, in the power plant.

Still another object of my invention is to control the speed of the main turbine by means of a governing mechanism of the fluid pressure type and to utilize the fluid pressure thus generated to control the load on the house turbine and consequently the amount of exhaust fluid discharged to the feed water heater.

A further object is to provide a governing system for a plurality of prime movers, which will control the admission valve of one prime mover in accordance with some operating condition of another prime mover, such as its load, its speed, or its motive fluid admission.

Figure 1:
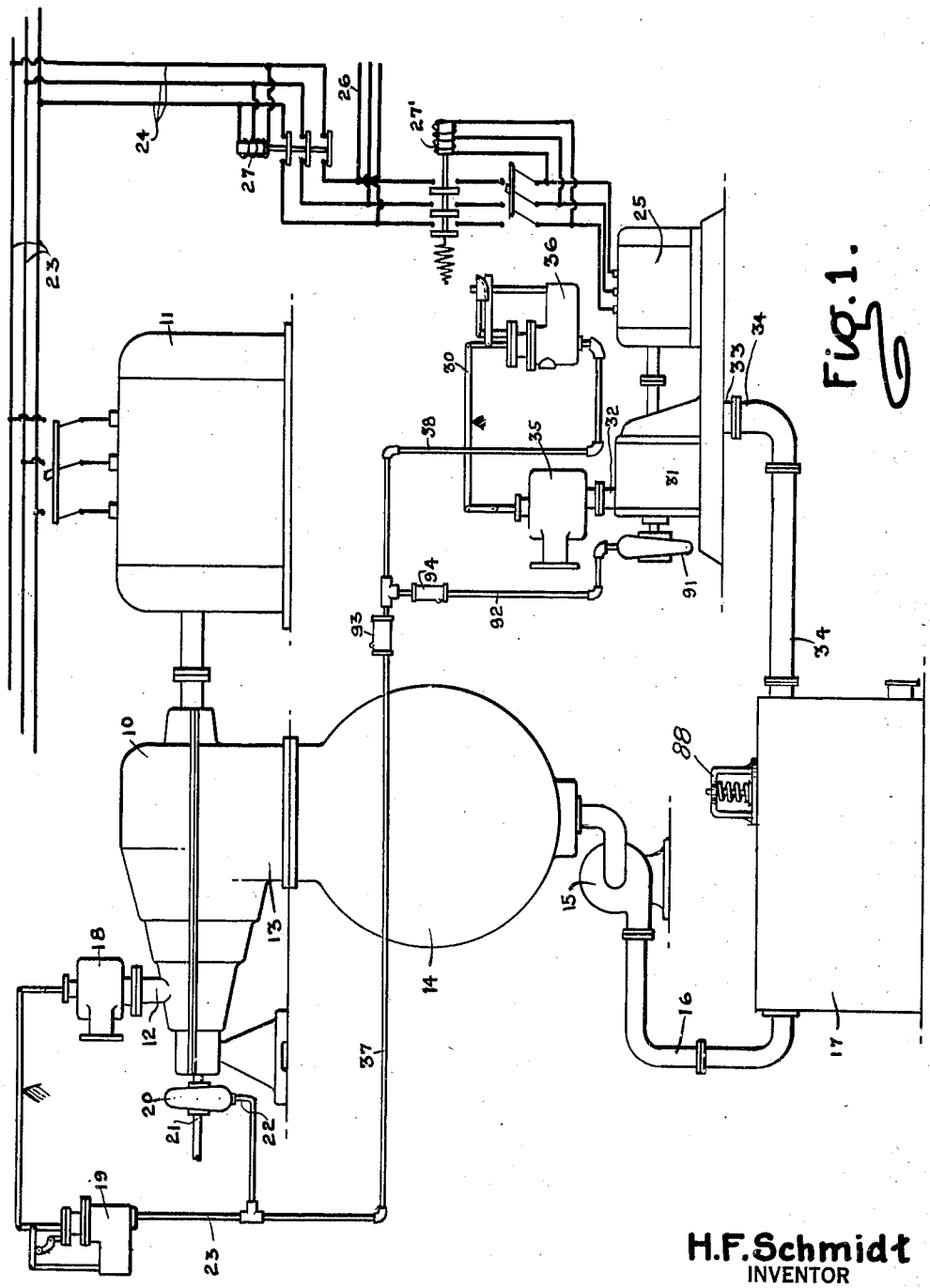
Figure 2:
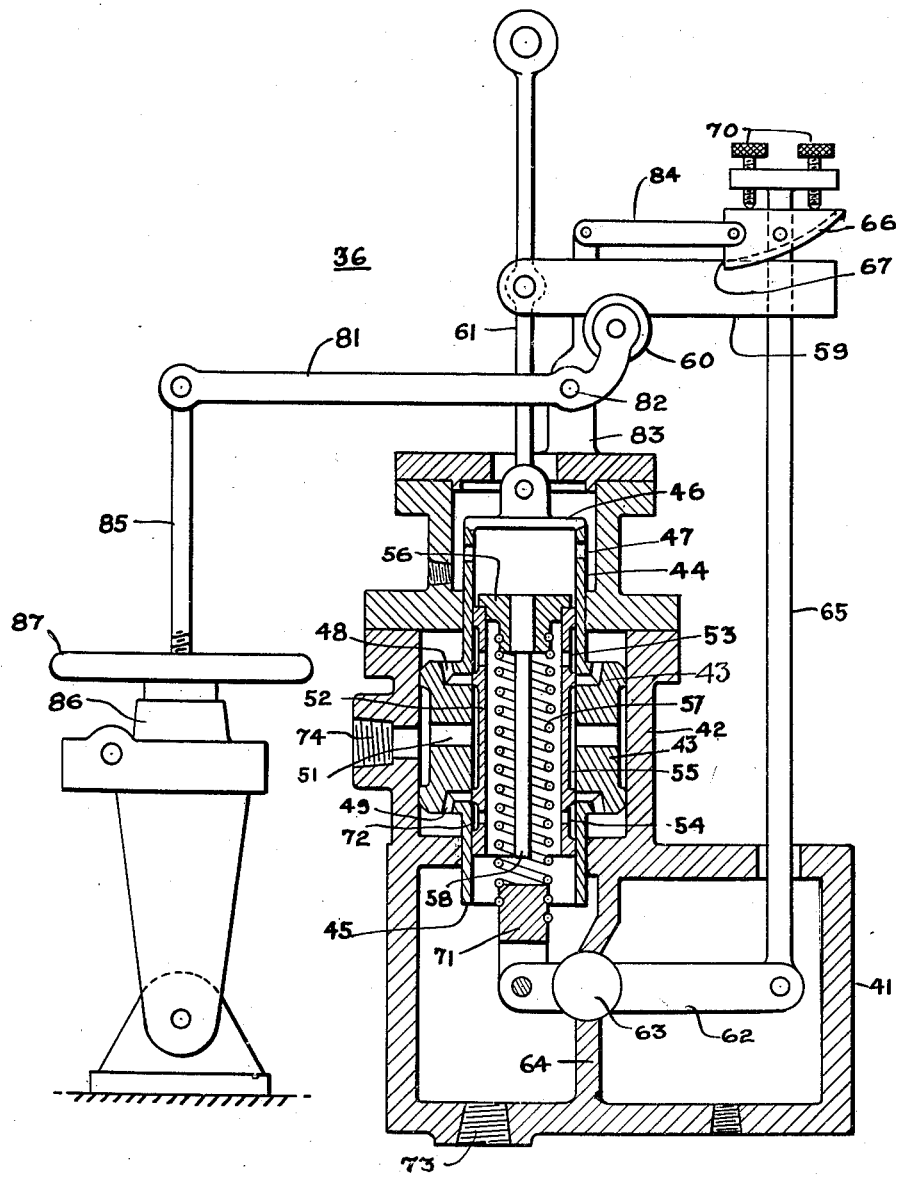

These and other objects, which will be made apparent throughout the further description of my invention, may be attained by the employment of the apparatus hereinafter described and illustrated in the accompanying drawing in which; Fig. 1 is a diagrammatic arrangement of one form of power plant embodying apparatus constructed in accordance with my invention; and Fig. 2 is an enlarged view, in sectional elevation, of the house turbine governing mechanism illustrated in Fig. 1.

In power plants, it is desirable that the feed water heater shall supply heated water at a uniform degree of temperature to the boilers. Such heaters are ordinarily supplied with heat derived from steam exhausted from the auxiliaries. As such auxiliaries ordinarily operate at substantially constant load, it is obvious that when the load on the plant or on the main turbo-generators exceeds a certain value, the exhaust steam from the auxiliaries is insufficient to heat the feed water to the desired temperature.

It has therefore been proposed to provide a house turbine through which steam in variable amounts flows to develop power and exhausts to a feed water heater to serve as a heating medium. One arrangement heretofore proposed is to provide a generator jointly driven by an auxiliary turbine and by an electric motor receiving power from the main busses, the admission valve of the turbine being under the control of a thermostat or pressure responsive device associated with the heater. In this manner, the amount of steam flowing through the turbine is so proportioned that the temperature of the water discharged from the heater is substantially constant even though the rate of flow is fluctuating.

My invention relates to apparatus of the character last referred to, but, instead of having the admission valve of the house turbine under the control of a thermostat or pressure responsive device associated with the feed water heater, I have the admission valve inter-connected with the governing mechanism of the main generator, so that, upon an increase in load upon the latter, the main generator governor not only operates to increase the quantity of steam admitted to the main unit, but it also operates to increase the quantity of steam admitted to the house turbine. With the house turbine controlled in this manner, it will be apparent that it may be so operated as to supply the requisite amount of exhaust to secure uniform heating of feed water for different loads. Obviously at times more steam may be admitted to the house turbine than is necessary to carry the auxiliary load and the excess power may be delivered to the main busses. This occurs for example, in winter when cold circulating water necessitates but low speed on the circulating pumps.

Furthermore, as the steam characteristics of the main turbine and of the house turbine are generally different and as the amount of motive fluid admitted to the two turbines changes disproportionately with various increases or decreases in load, it becomes necessary to provide some means which shall compensate for these variations in order that the amount of exhaust steam admitted to the heater may be maintained constantly proportional with respect to the amount of steam admitted to the main turbine throughout its entire range of capacity. In accordance with my invention, I have compensated for the above variations by associating with the governing mechanism of the house turbine a device which gradually alters the unit of valve lift for given changes in fluid pressure.

Referring to the drawings for a more detailed description of my invention, I show in Fig. 1 a main power-developing unit or turbine 10 for driving a main generator 11. The main turbine 10 is provided with a motive fluid inlet 12 and with an exhaust connection 13. A condenser 14 is provided for condensing the exhaust fluid discharged from the exhaust connection 13. For removing condensate, from the condenser, a condensate pump 15 is provided which discharges through a conduit 16 to a feed water heater 17.

Connected to the motive fluid inlet 12 of the main turbine is an admission valve 18 which is adjusted to different positions by means of a hydraulic or fluid pressure governing mechanism 19 which may be of a type similar to that shown in my Patent 1,533,767, issued April 14, 1925, and assigned to the Westinghouse Electric & Manufacturing Company, entitled Governor. The fluid pressure governing mechanism 19 may be actuated by a variable fluid pressure generated as a function of the speed of the main turbine. For supplying this fluid pressure, a governor pump 20, preferably of the centrifugal type and capable of developing a pressure which varies substantially as the square of the speed of the turbine 10, is connected to the rotor shaft of the turbine 10. The governor pump 20 is provided with an inlet connection 21 and a discharge connection 22 which communicates through a conduit 23 with the governing mechanism 19 for actuating the admission valve 18. Fluid may be supplied to the inlet connection 21 from any suitable source.

The generator 11 is connected to bus-bars 23 for supplying electrical energy to a power system. Also connected to the bus-bars 23 by suitable leads 24 is a house generator 25, which operates in synchronism with the main generator 11. Tapping off the leads 24 is a house circuit 26 for supplying electrical energy to various auxiliary machinery included in the power plant. Disposed in the leads 24 between the main generator 11 and the house circuit 26 is a low voltage relay mechanism 27 and between the house circuit and the house turbine is an overload circuit breaker 27' for insuring an uninterrupted supply of current to the house circuit upon abnormal diminution of voltage either across the bus-bars or across the terminals of the house generator.

The house generator 25 is driven by a house turbine 31 which is provided with a motive fluid inlet connection 32 and an exhaust connection 33. The exhaust connection 33 communicates through a conduit 34 with the feed water heater 17 for supplying heating fluid for increasing the temperature of the condensate discharged by the pump 15. The heater 17 is supplied with a safety valve 88 to relieve the pressure of the heating fluid in case it becomes excessive. Connected to the inlet 32 is a motive fluid admission valve 35 which is adjusted to different positions through a lever 30 by means of a hydraulic or fluid pressure governing mechanism 36. This governing mechanism is preferably of the type disclosed in my Patent 1,533,767, and is designed to control the admission of motive fluid to the house turbine 31 in response to a controlling fluid pressure. As illustrated, the necessary fluid pressure is supplied through conduits 37 and 38 from the governor pump 20 which is associated with the main turbine.

As shown to a larger scale in Fig. 2, the governor mechanism 36 comprises a casing 41 having a cylindrical upper portion defining an operating cylinder 42 in which an operating piston 43 is disposed. The operating piston 43 is hollow and is provided with tubular extensions 44 and 45 at its top and bottom, respectively, the top extension being closed by a cap 46 and provided with vent holes 47. The piston 43 is also provided with upper and lower admission ports 48 and 49, and an exhaust port 51, by means of which the operating fluid may be admitted above or below the piston 43 to move it up or down in the cylinder 42, or to maintain it stationary as is well understood in the art.

The admission of fluid to the ports 48 and 49 of the piston 43 is controlled by a tubular pilot valve 52 which is disposed within the hollow portion of the piston 43 and is provided with suitable upper and lower ports 53 and 54. The pilot valve 52 is also provided with a restricted portion forming an annular exhaust passage 55, affording communication between either of the piston ports 48 and 49 and the exhaust port 51. The tubular valve 52 is closed at its upper end by a head member 56, provided with a spring anchor to which a spring 57 is secured. An axially-disposed and downwardly-projecting stop 58 is provided on the valve 52.

A lever 59 fulcrumed on a flanged roller 60 is attached at one end to the operating piston head 46 by means of a link 61. The link is connected through the lever 30 to the admission valve 35 for actuating the same.

A lever 62 fulcrumed at 63 in a web 64 is provided in the casing 41. The outer end of the lever 62 is actuated, through a link 65, by the lever 59. The fulcrum point 63 is so selected that the inner arm of the lever 62 is shorter than the inner arm of the lever 59 so that upon actuation of said lever 62 by the operating piston and the lever 59, the inner arm of the lever 62 travels at a slower rate than the inner arm of the lever 59. As shown, the fulcrum 63 of the lever 62 is of the ball-and-socket type to prevent the passage of fluid through the web 64. Any suitable form of fulcrum might be employed, however, which is adapted to prevent the leakage of fluid through the web 64.

The link 65 has pivotally secured at its upper end a cam member 66. The lever 59 bears against this cam member in actuating the link 65. During a limited range of movement and a limited opening of the admission valve 35, the lever 59 bears upon the edge 67 of the cam member and during wider ranges of movement, when the admission valve 35 is opened wider, the lever 59 bears upon the curved portion of the surface of the cam member. It will be apparent that the relative movement of the link 65 and the piston 43 is constant until the lever 59 engages the curved surface of the cam member, whereupon the relative rate of movement of the link 65 with respect to the operating piston 43 will be altered. The cam member 66 may be adjusted angularly by means of adjusting screws 70—70.

Attached to the inner end of the lever 62 is a spring anchor 71 which is connected to the spring anchor of the head member 56 by the helical tension spring 57, the force of which tends to urge the pilot valve 52 downwardly. This force is opposed by the pressure of the fluid from the pump 20, which is communicated to the interior of the pilot valve 52 through an inlet connection 73 provided in the casing 41. The fluid pressure acts against the under side of the head 56 urging the pilot valve upwardly. The spring 57 is so chosen that at normal turbine speed the force exerted balances the pressure of the fluid acting upon the head 56 to maintain the pilot valve 52 in its neutral or cut-off position, closing the admission ports 48 and 49 of the piston 43, and thus maintaining said piston, and consequently the admission valve 35, stationary. The exhaust port 51 of the piston 43 communicates with an outlet 74 through which the fluid exhausted from above or below the piston 43 may be discharged to any desired location.

From the foregoing description it will be seen that as the speed of the main turbine 10 increases, incidentally increasing the demand for heated feed water, the greater fluid pressure resulting from the increased speed of the pump 20 overcomes the tension of the spring 57 and moves the pilot valve 52 upwardly, uncovering the piston port 49 and admitting fluid beneath the piston 43. Fluid above the piston 43 is exhausted through the port 48 and the passage 55 to the outlet 74. The pressure of the fluid beneath the piston 43 moves the latter upwardly until the ports 48 and 49 are again closed, the admission valve 35 being actuated through the link 61 and the lever 30.

In the same manner, when the turbine speed is reduced, the pump speed and consequently the fluid pressure decreases, the tension of the spring 57 overcomes the pressure of the fluid and moves the pilot valve 52 downwardly. Downward movement of the pilot valve 52 admits fluid through the port 48 above the piston 43 which then follows the pilot valve 52 in its downward movement until cut off occurs and the parts reach a new state of equilibrium.

In order to secure wide ranges of movement of the operating piston 43 with relatively small deflections of the spring 57, a follow-up mechanism is provided. This follow-up mechanism consists of the link 65, the lever 62 and its associated spring abutment 71. It will be apparent from the foregoing description that an upward movement of the pilot valve 52, with the incidental deflection of the spring 57, is followed by a proportional upward movement of the piston 43. As the inner arm of the lever 62 is shorter than the inner arm of the lever 59, the upward movement of the piston 43 will be greater than the upward movement of the spring abutment 71. This movement is transmitted to the lever 59 and thence through the follow-up mechanism to the spring abutment 71, so that the lower end of the spring 57 is given an upward movement of compensation for its previous deflection. The effect of this action is to permit the pilot valve 52 and operating piston 43 to travel a relatively wide distance for each unit of spring deflection before the ports 48 and 49 are covered. By suitable location of the relative position of the fulcrum points 60 and 63, this ratio of movement may be varied from zero to infinity.

During a limited range of movement of the operating piston 43, the lever 59 bears against the corner 67 of the cam member 66 and the motion transmitted by the lever 59 through the link 65 to the lever 62 is at a constant rate. So long as the lever 59 bears against the edge 67, the opening of the admission valve 35 varies as a function of the deflection of the spring 57 and of the variations in governing pressure. The range of movement of the admission valve 35, just described, is that wherein the R. P. M. of the house turbine 31 with respect to the R. P. M.

of the main turbine 13 are so proportioned as to produce a flow of steam through the house turbine which is proportional to the amount of steam flowing through the main turbine as determined by the load demands on the bus-bars.

Should the load demand on the bus-bars change to such an extent as might create a tendency to affect the rotational speeds of the main and house turbines differently, the cam member 66 is so arranged that the unit of lift of the admission valve 35 is gradually altered for given changes in fluid pressure as generated by the pump 20, thereby maintaining a flow of steam through the house turbine which is directly proportional to the amount of motive fluid required by the main unit throughout the entire range of electrical load.

In order to alter the amount of exhaust steam admitted to the heater 17 per unit of condensate, I provide means for adjusting the effective scale and tension of the spring 57. The flanged roller 60, which constitutes the fulcrum of the lever 59, is rotatably mounted on one end of a bell crank lever 81, fulcrumed at 82 to a lug 83 which is rigidly mounted on the governor casing 41. A radius link 84 is also connected to the lug 83 and to the cam member 66, which radius link serves to limit the lateral movement of the link 65 in relation to the fulcrum 60. The other end of the bell crank lever 81 is connected by means of a link 85 to any suitable speed-changing means, such as the screw and nut gearing 86. The gearing 86 is adapted for manual operation by a hand wheel 87, though any suitable means known to the art may be employed in adjusting the speed-changing mechanism. A movement of the link 85 in a downward direction causes the roller 60 to move upwardly. This raises the lever 59, increasing the distance between the two levers 59 and 62. The link 65 and the outer end of the lever 62 are raised by this movement and the inner end of the lever 62 lowered, pulling the pilot valve 52 downwardly, followed by the operating piston 43, thus opening the admission valve 35 wider. With the wider opening of the admission valve 35, the amount of exhaust steam admitted to the heater 17 is increased, thereby increasing the temperature of the feed water discharged from the heater, which increased temperature is automatically maintained thereafter. In a similar manner, an adjustment of the speed-changing mechanism causes a lowering of the roller 60 and effects a decrease in the temperature of the feed water.

The speed of the main turbine 10 is controlled by the governor 19 which actuates the admission valve 18 in response to the fluid pressure generated by the pump 20, in a manner well understood in the art. The amount of motive fluid admitted to the main turbine is dependent upon the electrical load carried by the bus-bars 23 and as the amount of steam admitted to the house turbine is directly proportional to the amount of steam admitted to the main turbine, it is apparent that the condensate discharged by the pump 15 is heated to a uniform degree of temperature irrespective of the volume of flow. The heated condensate, upon being discharged from the heater 17 may be utilized for various purposes such as feed water for the boilers of the power plant.

The connection of the house generator 25 through the leads 24 to the main busses and the tapping of the house service mains 26 from these leads permits the normal energization of the house mains from the house generator, any excess of power flowing to the main busses. Should the main units fail, the diminution of the main buss voltage opens the shunt breaker 27 and permits the continued energization of the house main from the house generator. Should a short circuit develop in the house generator, said unit is automatically disconnected by the shunt breaker 27' and the house mains are energized from the main busses. Inability of the house generator to carry the house load causes the deficiency to be carried from the main busses and, in extreme cases, the house generator may act as a motor without de-energizing the house mains.

I preferably provide, as illustrated in Fig. 1, additional governing means for the house turbine and generator which governing means shall remain normally ineffective until such time as the house turbo-generator may acquire an excessive rotational velocity whereupon it is temporarily governed by the additional governing means. This additional governing means comprises a pump of the rotating type 91 capable of developing a fluid pressure proportional to the rotational speed of the house turbine, and which discharges, through a conduit 92, to the conduit 38. Check valves 93 and 94, provided in the conduits 37 and 92, respectively, permit flow from said conduits to conduit 38, but prevent flow in the opposite direction.

The pump 91 is designed to generate a fluid pressure which, at normal operating speeds, is less than the pressure generated by the pump 20 associated with the main turbine. However, should the house turbo-generator assume an excessive rotational velocity, the pump 91 is capable of producing such a fluid pressure as will dominate that generated in the pump 20 and this dominating pressure acts upon the governor mechanism 36 to close the admission valve 35, thereby reducing the speed of the house turbine generator. Upon resumption of normal operating speed, the pump 20 of the main generator 10 resumes control of the governor mechanism 36. The additional governing means automatically governs the house turbine when the main turbine 10 is shut down in the following manner: As the speed of the turbine 10 decreases, the pressure developed by the pump 20 decreases and controls the governor mechanism 36 to move the valve 35 in opening direction.

The increased admission of motive fluid increases the speed of the house turbine, and the pressure developed by the pump 91 increases. Inasmuch as the pump 91 develops a lower pressure than the pump 20 for a given speed, the house turbine acquires a speed somewhat greater than normal operative speed before the pump 91 develops sufficient pressure to control the house turbine. As the pressure of the pump 91 increases, the valve 35 is moved in closing direction until equilibrium is established, as is well understood in the governor art, when the house turbine will be governed at a speed somewhat greater than normal operating speed.

While I have described my invention as being especially adapted for controlling the admission of motive fluid to a house turbine, it is to be understood that it may be applied in numerous ways and that it is especially adapted for use with dual drive apparatus, that is, apparatus in which both a steam turbine and an electric motor are employed to drive a single unit and in which the amount of steam supplied to the turbine is varied to suit the operating requirements, the remainder of the motive power required to drive the unit being supplied by the motor.

It will also be apparent that the governing system described above may be applied wherever it is desired to govern one prime mover in accordance with an operating condition of another prime mover. In the system disclosed, the house turbine is governend in accordance with the load, the speed and the fluid admission of the main turbine, inasmuch as the speed varies as a function of the load and the fluid admission is varied in response to speed.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a power plant installation, the combination of main and auxiliary power-developing units, admission valves for the units, a feed-water heater cooperating with said main unit, means for conveying heating fluid from the auxiliary unit to the feed-water heater, and means for controlling the admission valve of the auxiliary unit in accordance with the admission provided by the admission valve of the main unit.

2. In a power-plant installation, the combination of main and auxiliary power-developing units, admission valves for the units, a feed-water heater cooperating with said main unit, an exhaust connection between the auxiliary unit and the feed-water heater, governor mechanism operated by the main unit, and means whereby the governing mechanism may secure opening and closing movements of said valves.

3. In a power-plant installation, the combination of a main power-developing unit having an admission valve, fluid-pressure means operative in accordance with the speed of the unit for controlling the position of its valve, a feed-water heater cooperating with said main unit, an auxiliary power-developing unit, an exhaust connection between the auxiliary power-developing unit and the feed-water heater, and means operated by said fluid pressure means for controlling the admission of steam to the auxiliary power-developing unit.

4. In a power-plant installation, the combination of main and auxiliary power-developing units, admission valves for the units, a feed-water heater cooperating with said main unit, an exhaust connection between the auxiliary power-developing unit and the feed-water heater, motor devices for opening and closing the valves, and fluid-pressure means dependent upon the speed of the main power-developing unit for operating the motor devices.

5. In a power-plant installation, the combination of main and auxiliary power-developing units, admission valves for the units, a feed-water heater coopearting with said main unit, an exhaust connection between the auxiliary unit and the feed-water heater, means for developing fluid pressure in accordance with the speed of the main power-developing unit, and means associated with said valves for operating them in accordance with the pressure of fluid developed.

6. In a power-plant installation, the combination of main and auxiliary power-developing units, admission valves for the units, a feed-water heater cooperating with said main unit, an exhaust connection between the auxiliary power-developing unit and the feed-water heater, motor devices for operating the valves, and centrifugal means for developing fluid pressure to operate the motor devices.

7. In a power-plant installation, the combination of main and auxiliary power-developing units, admission valves for the units, a feed-water heater cooperating with said main unit, an exhaust connection between the auxiliary unit and the feed-water heater, motor devices associated with the valves, centrifugal means operated by the main power-developing unit for generating fluid pressure, and connections between the fluid-pressure developing means and the motor devices.

8. In a power-plant installation, the combination of main and auxiliary power-developing units, admission valves for the units, a water heater cooperating with said main unit, an exhaust connection between the auxiliary unit and the water heater, motor devices associated with the admission valves, a pump driven by the main power-developing unit for generating a fluid pressure proportional to its speed, and means for utilizing the fluid pressure generated for actuating the motor devices.

9. In a power-plant installation, the combination of main and auxiliary power-developing units, a heater cooperating with said main unit, an exhaust connection between the auxiliary power-developing unit and the heater, governor mechanisms responsive to fluid pressure for controlling the admission of motive fluid to the power-developing units, and means responsive to the speed of the main power-developing unit for generating a fluid pressure for actuating the governor mechanisms whereby the amounts of motive fluid admitted to the main and auxiliary power-developing units are proportionally maintained.

10. In a power-plant installation, the combination of two power-developing units for supplying a variable power demand, motive fluid admission valves for the units, a motor for each admission valve, means for developing a fluid pressure responsive to the speed of one of the power-developing units for actuating the motors, and means associated with the motor of the remaining power-developing unit for compensating for different speed variations in the units, whereby the amount of motive fluid admitted to the two power-developing units is maintained proportionally for various power demands.

11. In a power-plant installation, the combination of main and auxiliary power-developing units for supplying a variable power demand, motive fluid admission valves for the units, a motor for each admission valve, means for developing a fluid pressure responsive to the speed of one of the power-developing units for actuating the motors, and means associated with the motor of the remaining power-developing unit for altering the movements of its associated admission valve for compensating for different speed variations in the units, whereby the amounts of motive fluid admitted to the power-developing units are maintained proportionally for various power demands.

12. In a power-plant installation, the combination of main and auxiliary power-developing units for supplying a variable power demand, motive fluid admission valves for the units, a heater cooperating with said main unit, an exhaust connection between the auxiliary power-developing unit and the heater, a motor device for each admission valve, means for developing a fluid pressure responsive to the speed of the main power-developing unit for actuating the motor devices, and means associated with the motor device of the auxiliary power-developing unit for altering the movements of its associated admission valve for compensating for different speed variations in the units, whereby the amount of exhaust fluid supplied to the heater is proportioned to the amount of motive fluid admitted to the main power-developing unit.

13. In a power plant, the combination of main and auxiliary power-developing units for supplying a variable power demand, motive fluid admission valves for the units, a motor for each admission valve, means for developing a fluid pressure responsive to the speed of one of the power-developing units for actuating the motors, and means associated with the motor of the remaining power-developing unit for varying the opening of its admission valve per unit of variation in fluid pressure.

14. In a power plant, the combination of main and auxiliary power-developing units for supplying a variable power demand, motive fluid admission valves for the units, a motor for actuating each admission valve, means for developing a fluid pressure responsive to the speed of the main power-developing unit for actuating the motors, a heater cooperating with said main unit, an exhaust connection between the auxiliary power-developing unit and the heater, and means associated with the motor device of the auxiliary power-developing unit for varying the opening of its admission valve per unit of variation in fluid pressure, whereby the amounts of motive fluid admitted to the main power-developing unit and the auxiliary power-developing unit or heater are maintained proportionally for various power demands.

15. In a power plant, the combination of two power-developing units for supplying a variable power demand, motive fluid admission valves for the units, a motor for each admission valve, means for developing a fluid pressure responsive to the speed of one of the power-developing units for actuating the motors, and adjustable means associated with the motor of the remaining power-developing unit for compensating for different speed variations in the units, whereby the amounts of motive fluid admitted to the two power-developing units are maintained proportionally for various power demands.

16. In a power plant, the combination of two power-developing units, motive fluid admission valves for the units, a motor for each admission valve, means for developing a fluid pressure proportional to the speed of one of the power-developing units for actuating the motors, whereby the amounts of motive fluid admitted to the two power-developing units are substantially proportional, and adjusting means associated with one of the power-developing units for altering the proportion.

17. In a power plant, the combination of main and auxiliary power-developing units, motive fluid admission valves for the units, a feed water heater cooperating with said main unit, an exhaust connection between the auxiliary power-developing unit and the feed water heater, motor devices operated in response to the speed of the main power-developing unit for actuating the admission valves, whereby the amount of fluid exhausted to the heater and the amount of motive fluid admitted to the main power-developing unit are maintained proportionally, and adjusting means associated with the auxiliary power-developing unit for altering said proportion.

18. In a power plant, the combination of a primary power-developing unit, a secondary power-developing unit, the secondary unit performing some auxiliary function in conjunction with the primary unit, an admission valve for each unit, and means for governing the admission valves of both units in response to an operating condition of the primary unit, said means maintaining the auxiliary function performed by the secondary unit proportional to the load on the first unit.

19. In a power plant installation, the combination of main and auxiliary power-developing units, admission valves for the units, a feed-water heater cooperating with said main unit, means for supplying the feed-water heater with heating fluid discharged from the auxiliary unit, means for normally controlling the admission valve of the auxiliary unit in accordance with an operating condition of the main unit, and means for controlling said admission valve in accordance with an operating condition of the auxiliary unit upon a predetermined variation in said operating condition of the main unit.

20. In a power plant, the combination of a primary power-developing unit, a secondary power-developing unit, the secondary unit performing some auxiliary function in conjuction with the primary unit, means for governing both units in response to an operating condition of the primary unit, said means maintaining the auxiliary function performed by the secondary unit proportional to the load on the first unit, and governing means on the secondary unit for controlling the power output of the secondary unit proportional to the load on the secondary unit when the first unit is idle.

21. In a power plant, the combination of a primary power-developing unit, a secondary power-developing unit, means for governing both units in response to an operating condition of the primary unit, said means maintaining the power developed by the secondary unit proportional to the load on the first unit, and means for governing the secondary unit upon failure of the primary unit.

22. In a power plant, the combination of a primary power-developing unit, a secondary power-developing unit, the secondary unit performing some auxiliary function in conjunction with the primary unit, means for governing both units in response to an operating condition of the primary unit, said means maintaining the auxiliary function performed by the secondary unit proportional to the load on the first unit, and means for governing the secondary unit upon failure of the primary unit.

23. In a power plant, the combination of primary and secondary power-developing units, the secondary power-developing unit performing some auxiliary function in conjunction with the primary unit, means for governing the auxiliary unit in response to an operating condition of the primary unit and controlling the auxiliary function proportionally to the load on the primary unit, and means for governing the secondary unit in accordance with the load thereon upon failure of the first mentioned governing means.

24. In a power plant, the combination of primary and secondary power-developing units, the secondary power-developing unit performing the function of an auxiliary of the primary unit, and means for governing the secondary unit from the primary unit in accordance with the load carried by the primary unit, the secondary unit having means for governing it automatically operable upon failure of the first unit.

25. In a power plant, the combination of independently movable primary and secondary power-developing units, the secondary unit performing an auxiliary function in conjunction with the primary unit, speed-responsive means carried by one of said units, and motive fluid admission valve means carried by each of said units and controlled by said speed-responsive means.

26. The combination defined in claim 25 and speed-responsive means carried by the other of said units and operating the motive fluid admission valve of said other unit upon failure of the first-mentioned speed-responsive means.

27. In a power plant, the combination of primary and secondary power-developing units, motive fluid admission valves for the units, a motor for each admission valve, means for developing a fluid pressure responsive to the speed of one of the power-developing units for actuating the motors, and means for developing a fluid pressure responsive to the speed of the other power-developing unit for actuating the motor of said other unit upon failure of pressure in said first-mentioned means.

28. In a power plant installation, the combination of main and auxiliary power-developing units, admission valves for the units, a feed-water heater cooperating with said main unit, means for supplying the feed-water heater with heating fluid discharged from the auxiliary unit, means for normally controlling the admission valve of the auxiliary unit in accordance with the fluid admission to the main unit, and means for controlling said admission valve in accordance with an operating condition of the auxiliary unit upon a predetermined variation in said fluid admission to the main unit.

29. In a power plant, the combination of primary and secondary power-developing units, the secondary power-developing unit performing some auxiliary function in conjunction with the primary unit, an admission valve for the secondary unit, and means for governing the admission valve of the secondary unit from the primary unit in accordance with the fluid admission to the primary unit.

30. The combination with a plurality of prime movers, of a governing mechanism for controlling the admission of motive fluid to one of said prime movers comprising pressure-responsive means for controlling said admission, means responsive to the speed of one prime mover for controlling the fluid pressure applied to said pressure-responsive means in the normal operation of said prime movers, and means responsive to the speed of another prime mover for controlling the fluid pressure applied to the pressure responsive means when the last-mentioned prime mover attains a speed of a predetermined ratio to the speed of the prime mover normally controlling the pressure-responsive means.

31. The combination with a plurality of prime movers, of a governing mechanism for controlling the admission of motive fluid to one of the prime movers comprising pressure-responsive means for controlling said admission, means providing fluid pressure varying in response to change in speed of one prime mover, means for applying said fluid pressure to the pressure-responsive means to control the same in the normal operation of said prime movers, means providing fluid pressure varying in response to change in speed of another prime mover, and means for applying the latter variable fluid pressure to the pressure-responsive means to control the same when the last-mentioned prime mover attains a speed which is of a predetermined ratio to the speed of the prime mover providing the first-mentioned fluid pressure.

32. The combination with a plurality of prime movers, of governing mechanism for controlling the admission of motive fluid to one of the prime movers comprising pressure-responsive means for controlling said admission, a centrifugal pump driven by each prime mover and developing a fluid pressure varying substantially as the square of the speed thereof, the pressure developed by one pump being greater than the pressure developed by the other pump or pumps in the normal operation of the prime movers, conduit means providing communication between the pressure-responsive means and the pumps, and a check valve in the conduit means for each pump for preventing flow of fluid thereto from another pump.

33. In combination, a plurality of prime movers, means for connecting said prime movers and maintaining the speeds thereof in predetermined proportion in the normal operation thereof, and governing mechanism for controlling the admission of motive fluid to one of the prime movers comprising pressure responsive means controlling said admission, means associated with each prime mover for providing a fluid pressure varying as a function of the speed thereof, the fluid pressure developed by one of said pressure providing means being greater than the fluid pressure provided by another of said means when the speeds are in such predetermined proportion, and means for applying the greater fluid pressure to the pressure responsive means, whereby the fluid pressure developed by said one pressure providing means controls the pressure responsive means in normal operation, and the fluid pressure provided by said other of such means controls the pressure responsive means when the prime mover associated therewith attains a speed above its proportional speed.

In testimony whereof, I have hereunto subscribed my name this twenty-eighth day of January, 1925.

HENRY F. SCHMIDT.